J. B. KENNY.
FRUIT BASKET COVER.
APPLICATION FILED DEC. 7, 1921.
1,408,949.
Patented Mar. 7, 1922.
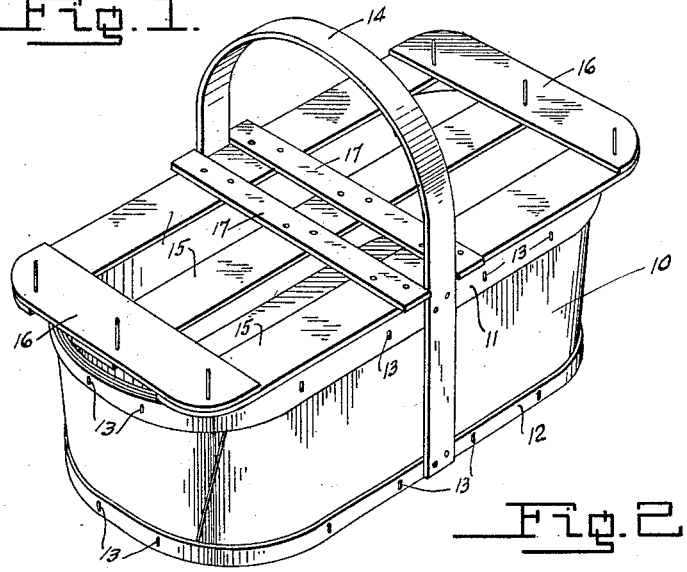
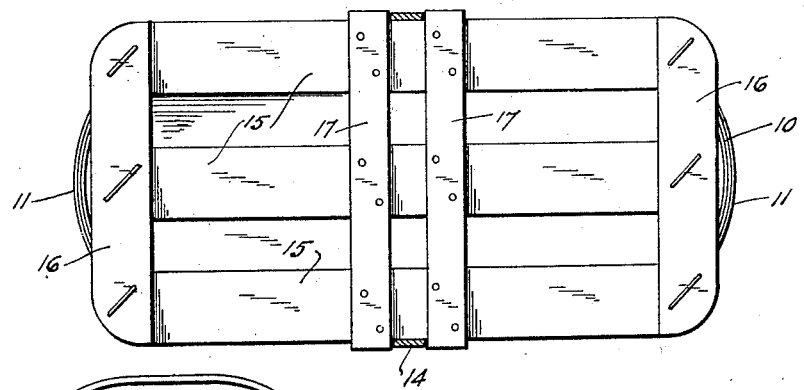
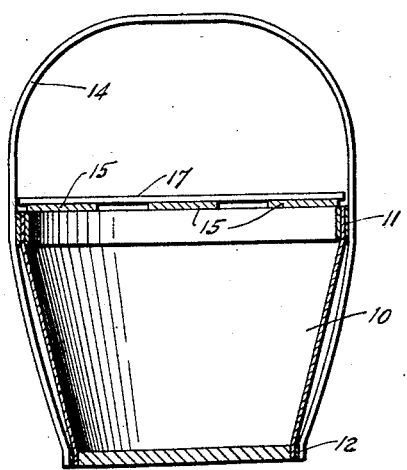
Inventor
John B. Kenny
By Watson E. Coleman
Attorney

UNITED STATES PATENT OFFICE.

JOHN B. KENNY, OF GENEVA, NEW YORK.

FRUIT-BASKET COVER.

1,408,949.   Specification of Letters Patent.   Patented Mar. 7, 1922.

Application filed December 7, 1921. Serial No. 520,664.

*To all whom it may concern:*

Be it known that I, JOHN B. KENNY, a citizen of the United States, residing at Geneva, in the county of Ontario and State of New York, have invented certain new and useful Improvements in Fruit-Basket Covers, of which the following is a specification, reference being had to the accompanying drawings.

This invention relates to basket covers, and particularly to covers for large fruit baskets.

The covers for large fruit baskets are made in the form known as "slatted covers," that is made of longitudinal and transverse slats designed to slip in beneath the handle and fit over the top of the basket, these covers at the present time being engaged with the basket by four hooks, two at each end, to prevent endwise movement of the covers. These hooks cost $1.80 for a thousand baskets and the labor cost of attaching these hooks to a thousand baskets would be in excess of $5 per thousand, the material of the basket being relatively hard and it being relatively difficult to insert the hooks in the wood. Many of these hooks shake off in transit and the basket arrives at the destination with the fruit injured, due to the slipping off of the cover, rendering the fruit unsalable.

The general object of my invention is to so form a slatted cover that certain of the slats of the cover will engage the handle to hold the cover in place from any endwise movement and do away with the necessity of these supplementary fastening devices to hold the cover in its proper position on the basket.

A further object is to provide a cover of this character which will engage the handle and thus be held in place on the basket with practically no added expense over the ordinary cover used today.

Another object is to so construct the cover and basket that a downward pressure exerted on the handle of the basket or an outward pull on the legs of the handle will permit the ready detachment of the cover, the elasticity of the handle acting to lock the cover in place and prevent any longitudinal shifting of the cover.

Other objects will appear in the course of the following description.

My invention is illustrated in the accompanying drawings, wherein:—

Figure 1 is a perspective view of a basket having a cover constructed in accordance with my invention;

Figure 2 is a top plan view of the basket and cover, the handle being shown in section;

Figure 3 is a vertical transverse section of the basket and cover showing the handle of the basket depressed to spread the basket and thereby disengage the handle from between the strips 17 of the cover;

Referring to these drawings, 10 designates the basket which is made of veneer or like material and rectangular in general plan, the veneer from which the body of the basket is made being engaged by outer, peripherally extending straps 11 and 12 held to the veneer by means of the clinched staples 13 or like means. The handle 14 is of a wooden strip which is stapled, riveted or otherwise attached to the strips 11 and 12 and arches over the basket. This handle is attached to the exterior of the basket. By pressing downward upon the top of this handle, the basket may be expanded or the walls of the basket spread apart, and when this pressure is released the elasticity of the handle causes the walls of the basket to close toward each other. So far, I have described a basket which is of ordinary form.

The cover of the basket, as illustrated in Figure 1, consists of three longitudinally extending strips 15 of thin board or veneer having a length approximately the full length of the basket and two end strips 16 which are nailed to the ends of the strips 15. At the middle of the cover there are two relatively narrow, transverse strips 17 which are nailed or stapled to the strips 15, these strips 17 being spaced from each other a distance equal to the width of the handle 14 and projecting beyond the outer margins of the strips 15 a distance equal to or slightly greater than the thickness of the handle. As before remarked, these strips 17 are disposed from each other a distance equal to the width of the handle so that when the cover is in place these reinforcing strips 17 will project on each side of the handle and when the cover is in place will prevent any longitudinal movement of the cover. The cover can be tilted somewhat or lifted bodily somewhat but it cannot be longitudinally shifted. If it be desired to remove the cover, it is only necessary to press downward upon the handle, (see Fig. 3,) which will spread the sides a sufficient distance to permit the handle to pass the projecting ends of the straps 17 and then the cover may be removed by longitudinally shifting the cover, the cover being replaced by a reverse action.

In the old form of slatted cover, the cover was composed of either five or six strips. When five strips were used, the middle strip extended transversely across the cover but had a length equal to the distance between the inner faces of the handle and did not engage the handle to prevent any longitudinal movement of the cover. When six strips were used, the three transverse strips were placed equi-distantly upon the cover and did not project out beyond the side margins of the cover and, therefore, did not engage the handle to prevent longitudinal movement of the cover. Therefore, it was necessary to provide supplementary or adjunctive fastening devices to hold the cover in place.

It will be noted that my device is no more costly than the ordinary slatted cover and at the same time the cover is held firmly in place from accidental detachment, thus very greatly cheapening this form of basket. The transverse strips, it will be obvious, perform the function of bracing and reinforcing the slatted cover, while at the same time they perform the further function of locking the cover in place. The transverse strips may be disposed a sufficient distance from each other to accommodate slight irregularities in the placing of the handle or irregularities in the width of the handle and while there may be a slight longitudinal movement of the cover this is so slight as to have no deleterious effect.

I claim:—

1. The combination with a basket and a handle therefor, the ends of the handle being attached to the exterior of the basket, of a slatted cover therefor having transverse spaced reinforcing strips disposed at the middle of the cover in spaced relation to each other, the strips projecting beyond the side edges of the cover to thereby form recesses on each side of the cover within which the handle is received.

2. A cover for fruit baskets comprising longitudinal slats and transverse slats, there being two of the transverse slats disposed adjacent the middle of the basket in spaced relation to each other, the ends of the transverse slats projecting beyond the side edges of the longitudinal slats whereby the said projecting ends may engage the handle of the basket to hold the cover from longitudinal movement.

In testimony whereof I hereunto affix my signature.

JOHN B. KENNY.